US012722047B1

(12) United States Patent
Seluga et al.

(10) Patent No.: US 12,722,047 B1
(45) Date of Patent: Sep. 1, 2026

(54) MULTIPLE LAYERED FACE FOR A GOLF CLUB HEAD

(71) Applicant: Callaway Golf Company, Carlsbad, CA (US)

(72) Inventors: James Seluga, Carlsbad, CA (US); Yaming Pan, Carlsbad, CA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

(21) Appl. No.: 19/462,736

(22) Filed: Jan. 28, 2026

Related U.S. Application Data

(63) Continuation-in-part of application No. 19/255,319, filed on Jun. 30, 2025.

(60) Provisional application No. 63/922,833, filed on Nov. 21, 2025, provisional application No. 63/672,089, filed on Jul. 16, 2024.

(51) Int. Cl.

| | |
|---|---|
| ***A63B 53/04*** | (2015.01) |
| ***B32B 15/01*** | (2006.01) |
| ***B33Y 80/00*** | (2015.01) |

(52) U.S. Cl.
CPC ...... *A63B 53/0429* (2020.08); *A63B 53/0458* (2020.08); *B32B 15/013* (2013.01); *B33Y 80/00* (2014.12); *A63B 53/0412* (2020.08); *A63B 53/0466* (2013.01); *A63B 2209/02* (2013.01); *B32B 2250/03* (2013.01); *B32B 2307/54* (2013.01); *B32B 2307/7376* (2023.05); *B32B 2311/18* (2013.01); *B32B 2311/30* (2013.01)

(58) Field of Classification Search
CPC ........................ A63B 53/0429; A63B 53/0425
See application file for complete search history.

(56) References Cited

U.S. PATENT DOCUMENTS

| | | | | |
|---|---|---|---|---|
| 6,007,432 | A | 12/1999 | Kosmatka | |
| 6,074,309 | A | 6/2000 | Mahaffey | |
| 6,248,025 | B1 | 6/2001 | Murphy et al. | |
| 6,273,831 | B1 | 8/2001 | Dewanjee | |
| 6,348,015 | B1 | 2/2002 | Kosmatka | |
| 6,354,962 | B1 | 3/2002 | Galloway et al. | |
| 6,364,789 | B1 | 4/2002 | Kosmatka | |
| 6,390,932 | B1 | 5/2002 | Kosmatka et al. | |
| 9,265,996 | B1 | 2/2016 | Abbott et al. | |
| 9,283,447 | B1 | 3/2016 | DeMille et al. | |
| 9,283,449 | B1 | 3/2016 | DeMille et al. | |
| 9,908,016 | B2 | 3/2018 | Seluga et al. | |
| 10,039,964 | B1 | 8/2018 | Westrum et al. | |
| 10,039,965 | B1 | 8/2018 | Seluga et al. | |
| 10,065,085 | B2 | 9/2018 | Seluga et al. | |
| 10,105,579 | B1 | 10/2018 | DeMille et al. | |
| 10,653,927 | B2 | 5/2020 | Murphy et al. | |
| 10,940,371 | B2 | 3/2021 | Murphy et al. | |
| 11,524,213 | B1 * | 12/2022 | Roach | B22F 10/00 |
| 11,618,052 | B2 | 4/2023 | Reed et al. | |
| 11,623,240 | B2 | 4/2023 | Reed et al. | |

(Continued)

*Primary Examiner* — Raeann Gorden
(74) *Attorney, Agent, or Firm* — Michael A. Catania; Daniel Moderick

(57) ABSTRACT

A golf club head having a multiple layered face is disclosed herein. The face comprises a first layer, a second layer and a third layer. The first layer is composed of a titanium alloy material. The second layer is composed of a polyurea material. The third layer is composed of a composite material. The face has a total thickness ranging from 0.030 inch to 0.500 inch.

7 Claims, 19 Drawing Sheets

(56) References Cited

U.S. PATENT DOCUMENTS

| | | | | |
|---|---|---|---|---|
| 11,786,784 | B1 | 10/2023 | DeMille et al. | |
| 11,986,709 | B2 | 5/2024 | Murphy et al. | |
| 2004/0053704 | A1* | 3/2004 | Gilbert ................. | A63B 53/047<br>473/332 |
| 2021/0077865 | A1* | 3/2021 | Morales ................. | A63B 60/02 |

* cited by examiner

MULTIPLE LAYERED FACE FOR A GOLF CLUB HEAD

CROSS REFERENCES TO RELATED APPLICATIONS

The Present Application claims priority to U.S. Provisional Patent Application No. 63/922,833, filed on Nov. 21, 2025, and the Present Application is a continuation-in-part application of U.S. patent application Ser. No. 19/255,319, filed on Jun. 30, 2025, which claims priority to U.S. Provisional Patent Application No. 63/672,089, filed Jul. 16, 2024, each of which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention relates to a golf club heads. More specifically, the present invention relates to faces for golf club heads.

Description of the Related Art

The prior art discloses several different composite golf club face concepts. For example, U.S. Pat. Nos. 5,310,185, 6,607,623, 6,612,938, 7,267,620, 7,628,712, 7,850,546, 7,862,452, 7,871,340, 8,096,897, and 8,163,119, disclose face inserts or face components formed of multiple prepreg plies, while U.S. Pat. Nos. 7,874,936, 7,874,937, 7,874,938, and 8,303,435, disclose face plates composed of multiple composite prepreg plies and prepreg strips to achieve variable face thickness.

Prepreg plies are not the ideal materials to use for golf club face construction, however, because using these materials to create the variable face thickness patterns that are demanded by consumers can be time consuming (the plies must be oriented by hand in a mold), expensive (the cost of plies can be high), and wasteful (scrap parts of the plies cannot easily be reused). Therefore, there is a need for improved materials and methods to create composite golf club faces.

BRIEF SUMMARY OF THE INVENTION

One aspect of the present invention is a golf club head comprising a frame made of metallic material. The frame has a single or plurality of openings, a metallic strike face with an inner wall opposite the strike face, a polymeric material permanently positioned on the inner wall and having a polymeric back wall, and a panel of non-metallic material positioned permanently to the polymeric back wall. The coverage of both combine to cover a portion of or all of the strike face inner wall. The single or plurality of openings in the metallic frame are covered with panels that enclose the interior volume of the golf club head.

Another aspect of the present invention is a golf club head comprising a body and a face attached to the body. The face comprises a first layer, a second layer and a third layer. The first layer is composed of a metal material and has a thickness ranging from 0.020 inch to 0.200 inch. The second layer is attached to an internal surface of the first layer. The second layer is composed of a polyurea material and has a thickness ranging from 0.003 inch to 0.150 inch. The third layer attached to an internal surface of the second layer. The third layer is composed of a composite material and has a thickness ranging from 0.005 inch to 0.150 inch. The face has a total thickness ranging from 0.030 inch to 0.500 inch.

Yet another aspect of the present invention is a golf club head with a multiple layered face attached to a body. The face comprises a first layer, a second layer and a third layer. The first layer is composed of a titanium alloy material and has a thickness ranging from 0.08 inch to 0.15 inch. The second layer is attached to an internal surface of the first layer. The second layer is composed of a polyurea material and has a thickness ranging from 0.005 inch to 0.02 inch. The third layer is attached to an internal surface of the second layer. The third layer is composed of a composite material and has a thickness ranging from 0.022 inch to 0.08 inch.

Yet another aspect of the present invention is a golf club with a multiple layered face. The face comprises a first layer, a second layer and a third layer. The first layer is composed of a metal material and has a thickness ranging from 0.025 inch to 0.150 inch. The second layer is attached to an internal surface of the first layer. The second layer is composed of a polyurea material and has a thickness ranging from 0.005 inch to 0.05 inch. The third layer attached to an internal surface of the second layer. The third layer is composed of a composite material and has a thickness ranging from 0.01 inch to 0.05 inch. The face has a total thickness ranging from 0.04 inch to 0.250 inch.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
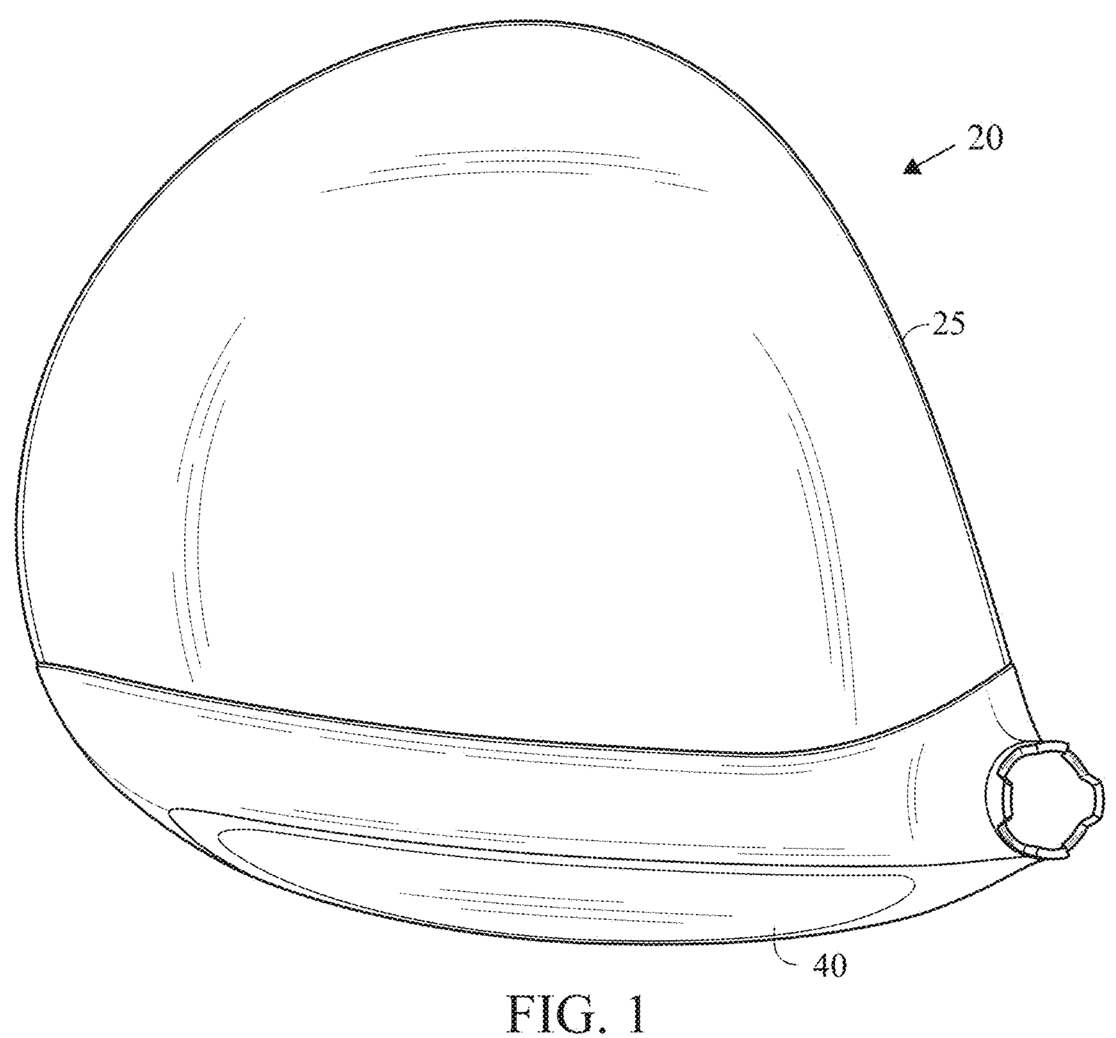
FIG. 1 is a top plan view of a golf club head.
Figure 2:
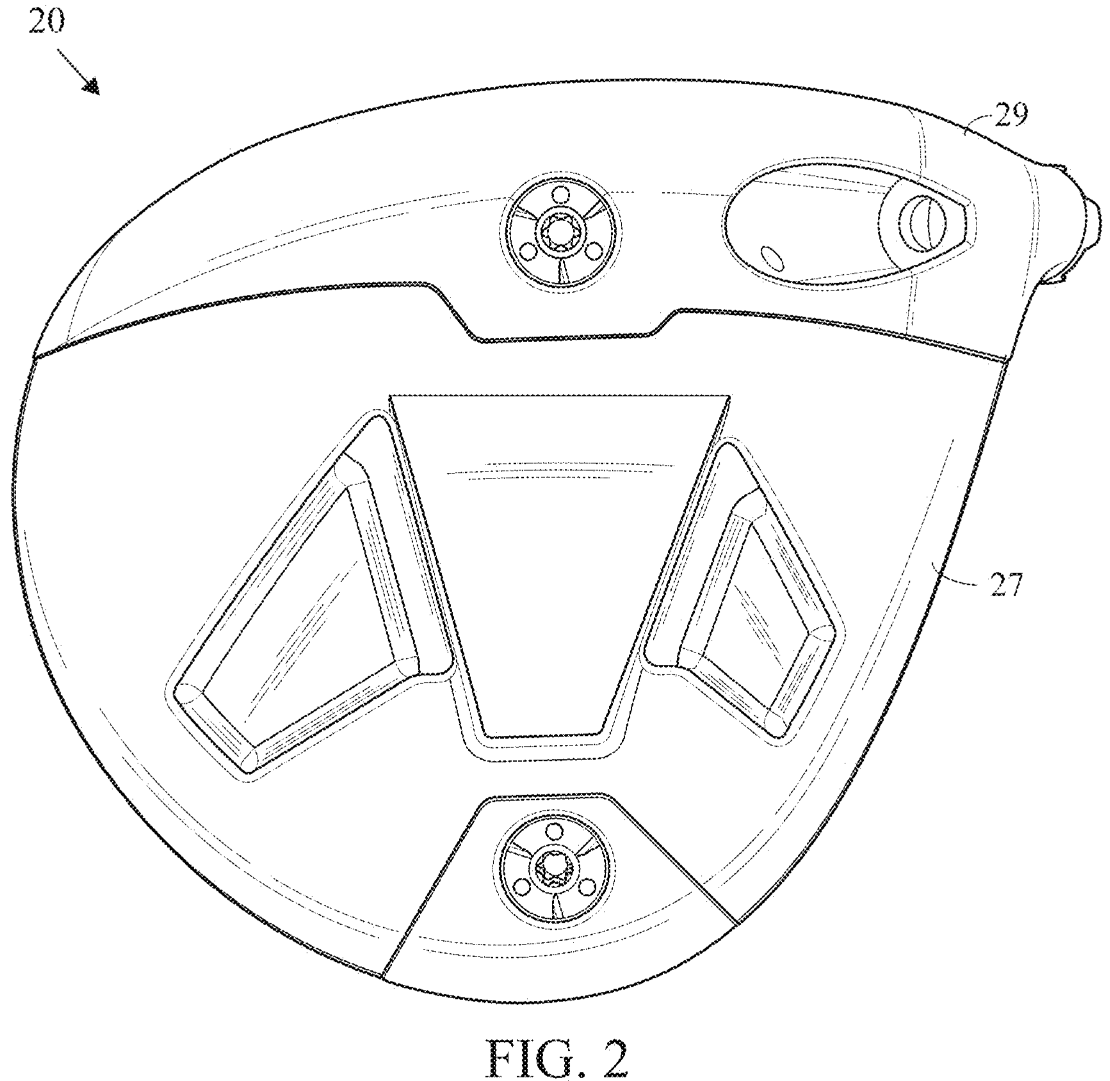
FIG. 2 is a bottom plan view of a golf club head.
Figure 3:
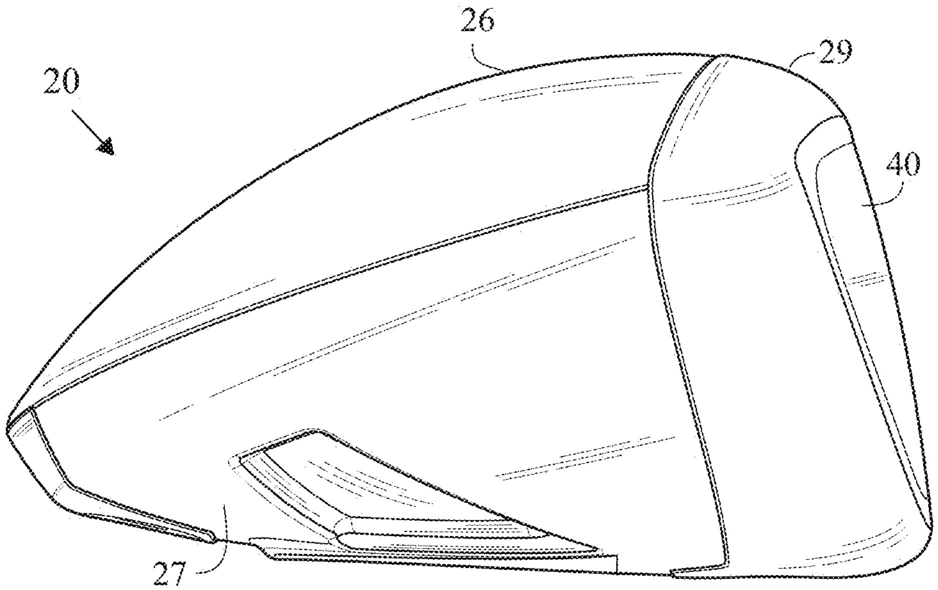
FIG. 3 is a toe-side elevation view of a golf club head.
Figure 4:
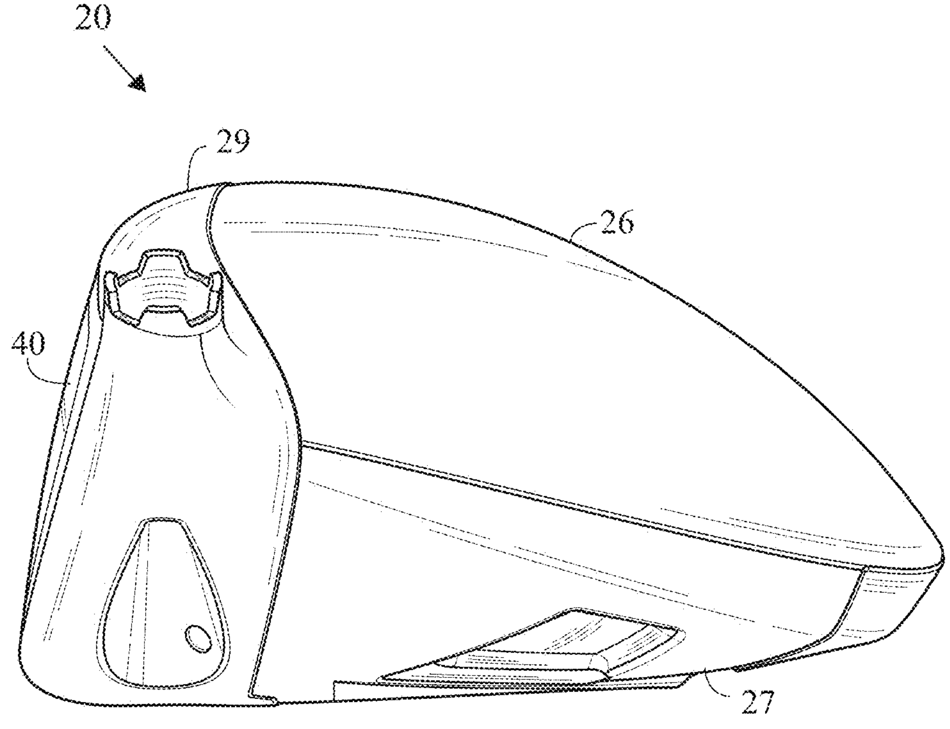
FIG. 4 is a heel-side elevation view of a golf club head.
Figure 5:
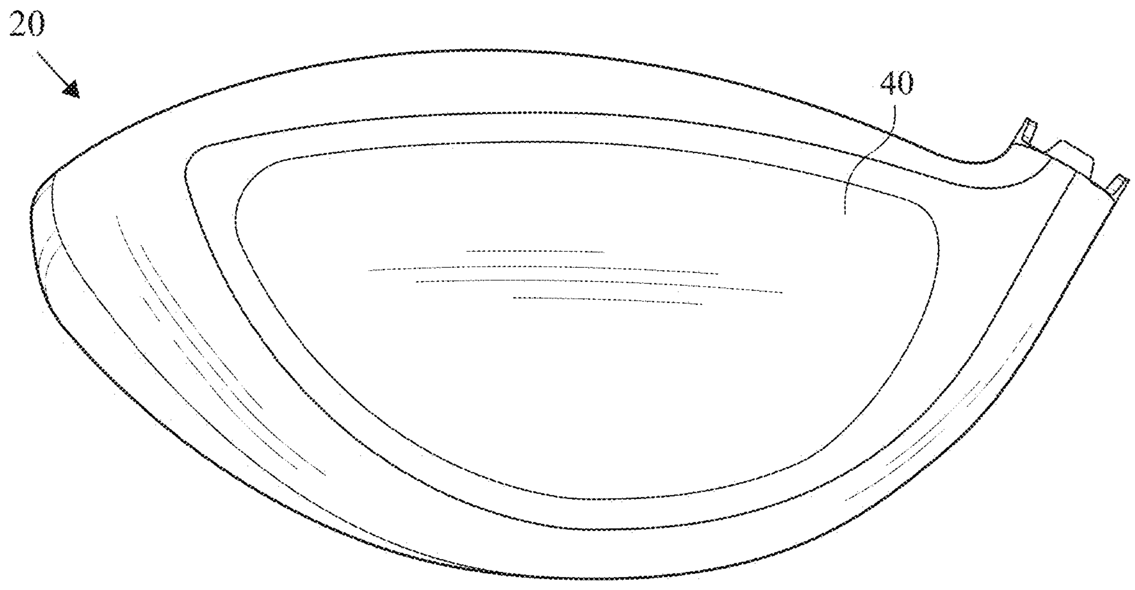
FIG. 5 is a front elevation view of a golf club head.
Figure 6:
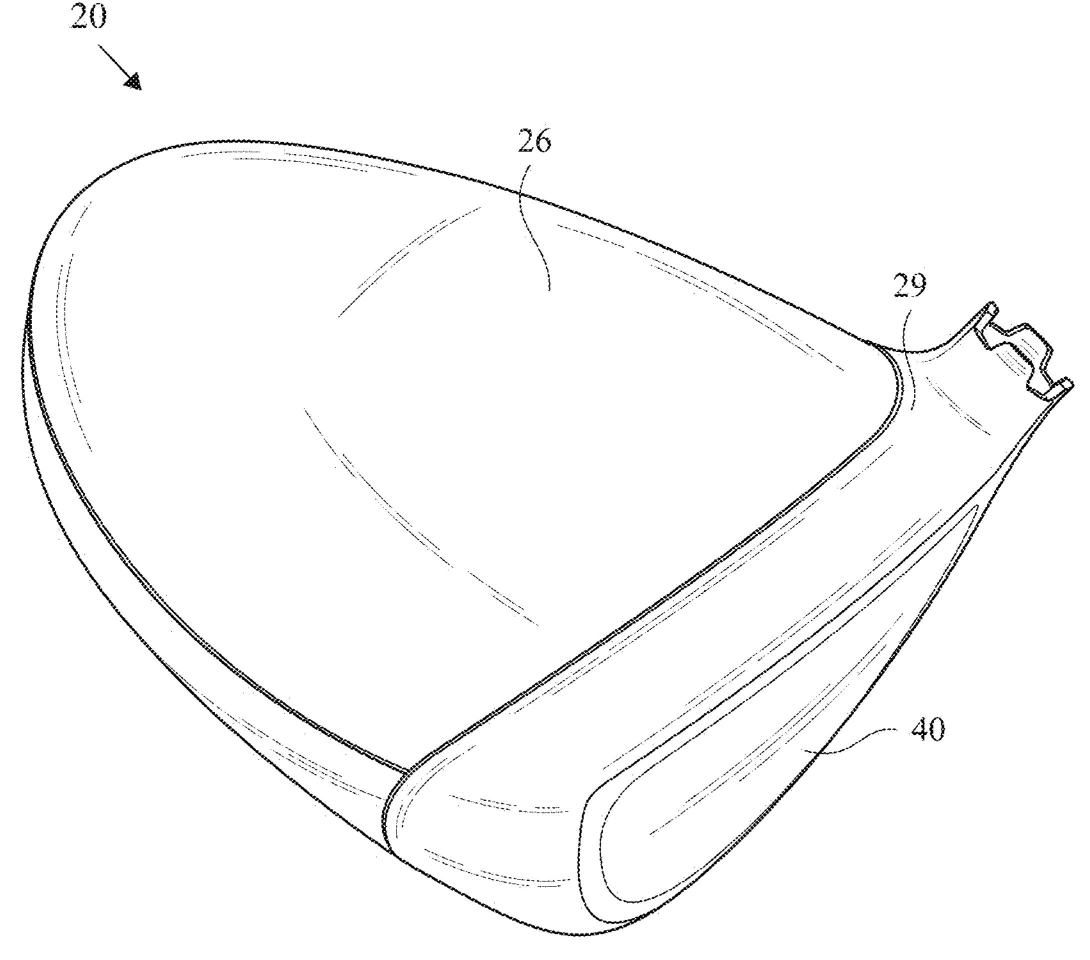
FIG. 6 is a top perspective view of a golf club head.
Figure 7:
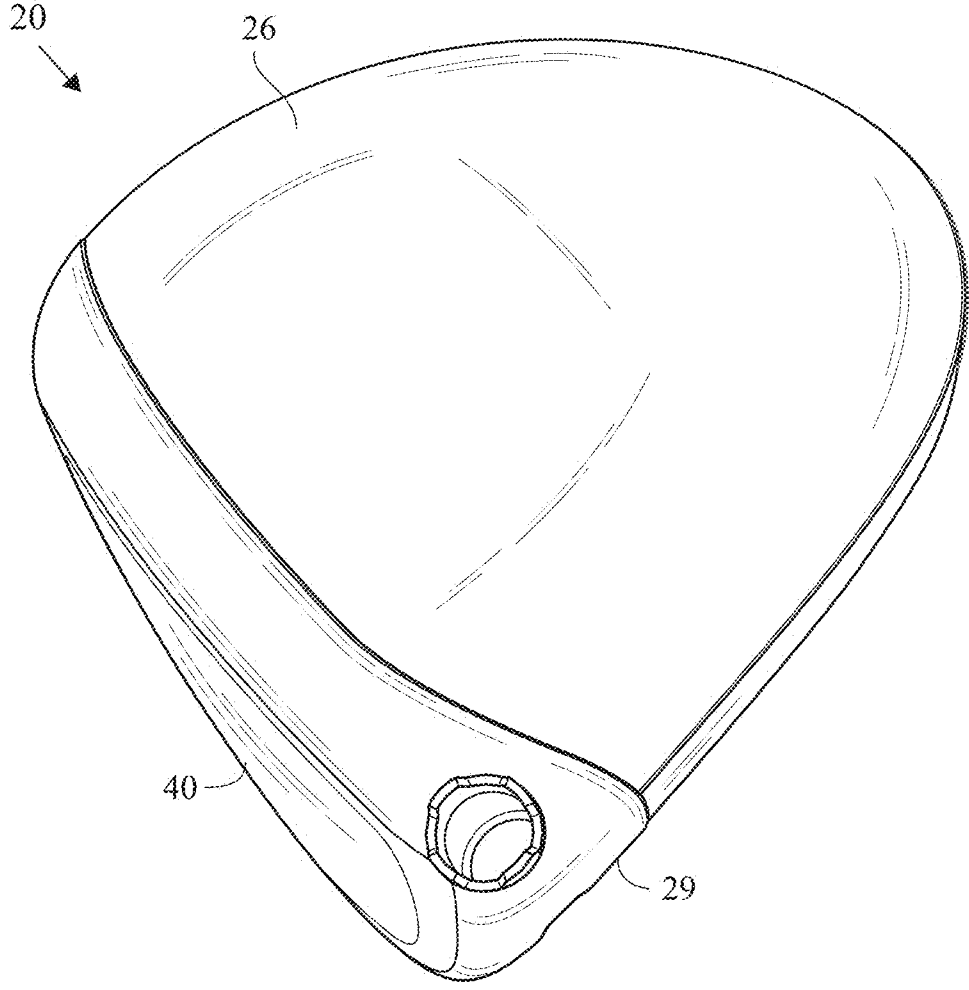
FIG. 7 is a top perspective view of a golf club head.
Figure 8:
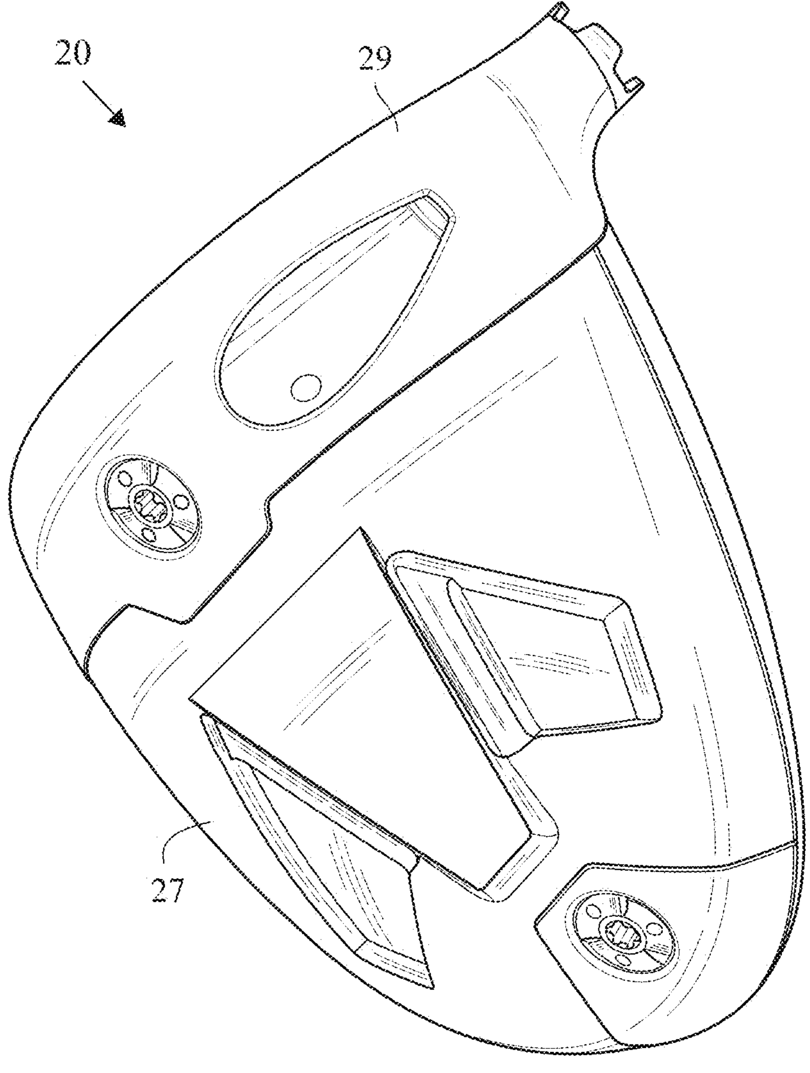
FIG. 8 is a bottom perspective view of a golf club head.
Figure 9:
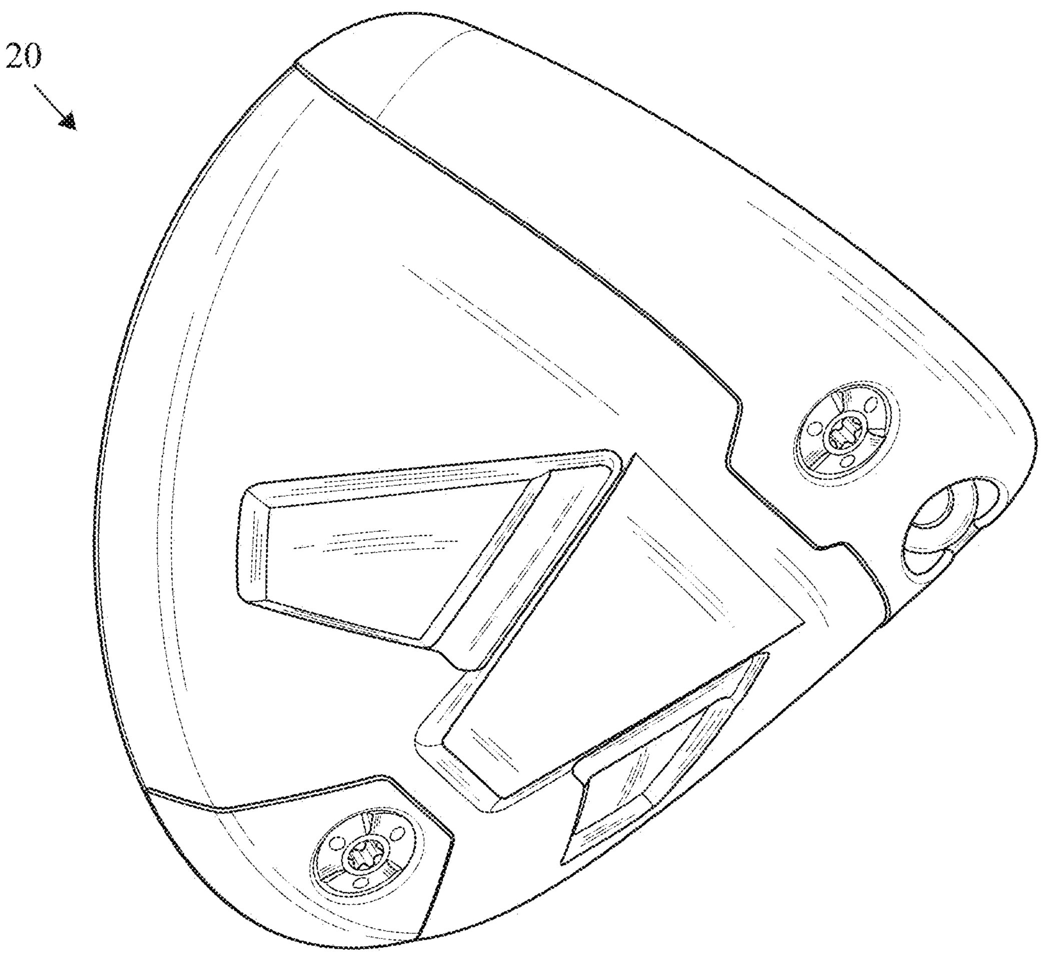
FIG. 9 is a bottom perspective view of a golf club head.
Figure 10:
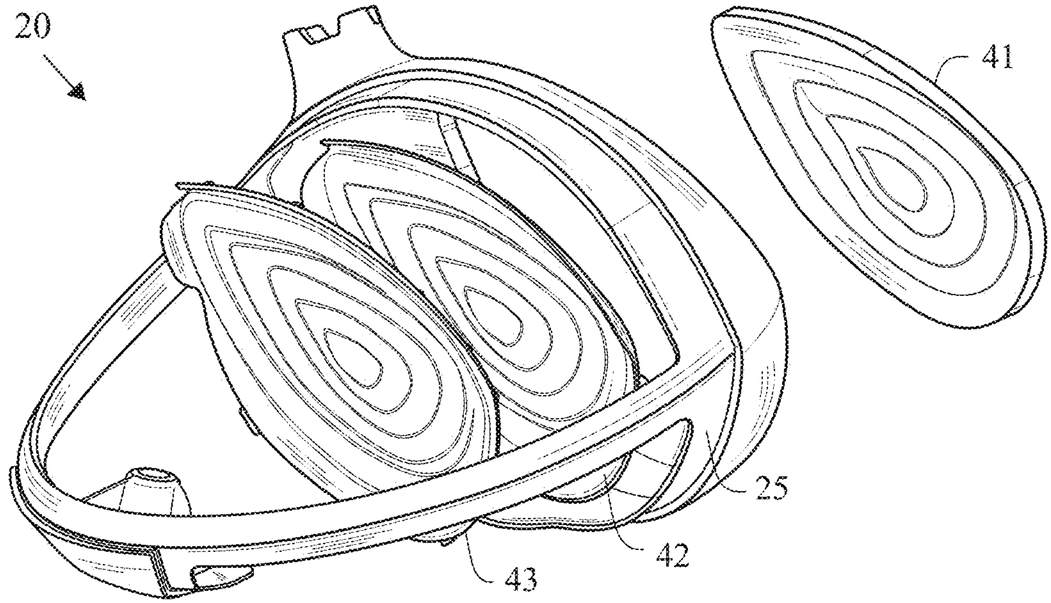
FIG. 10 is an exploded view of components of a golf club head.
Figure 11:
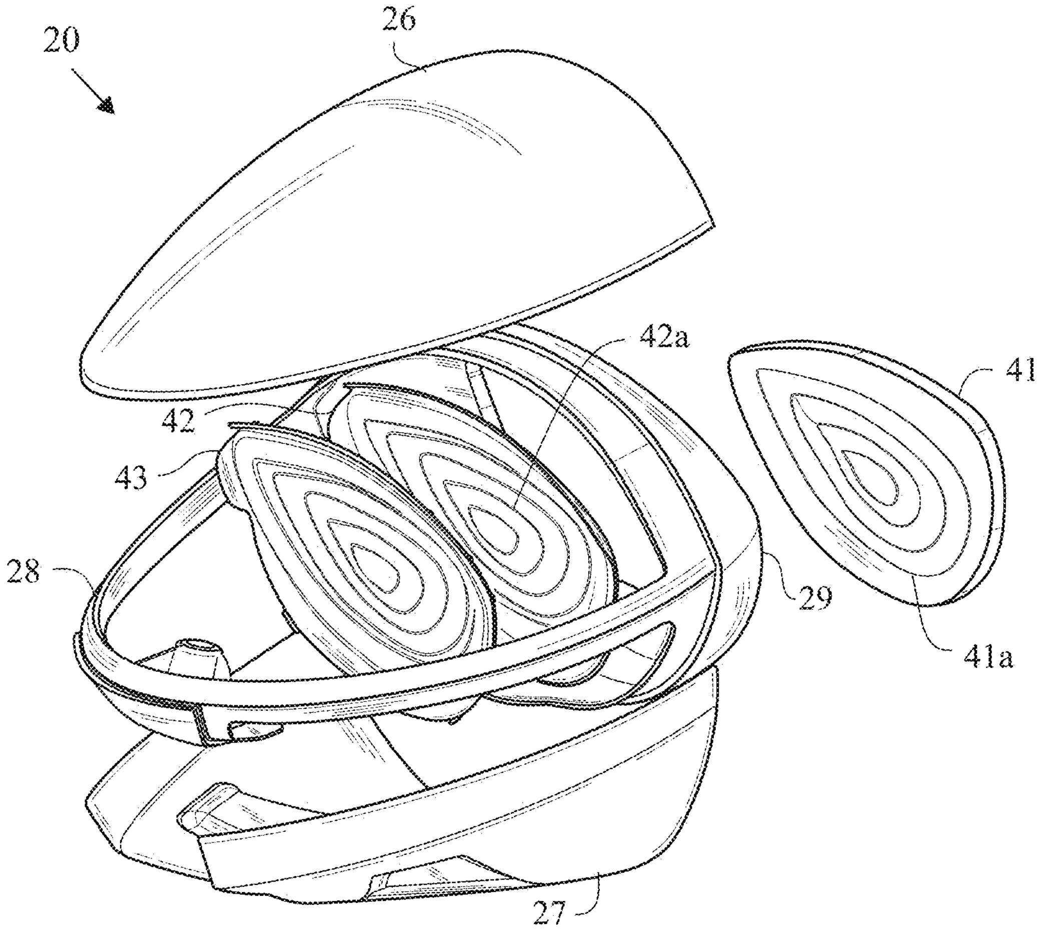
FIG. 11 is an exploded view of components of a golf club head.
Figure 12:
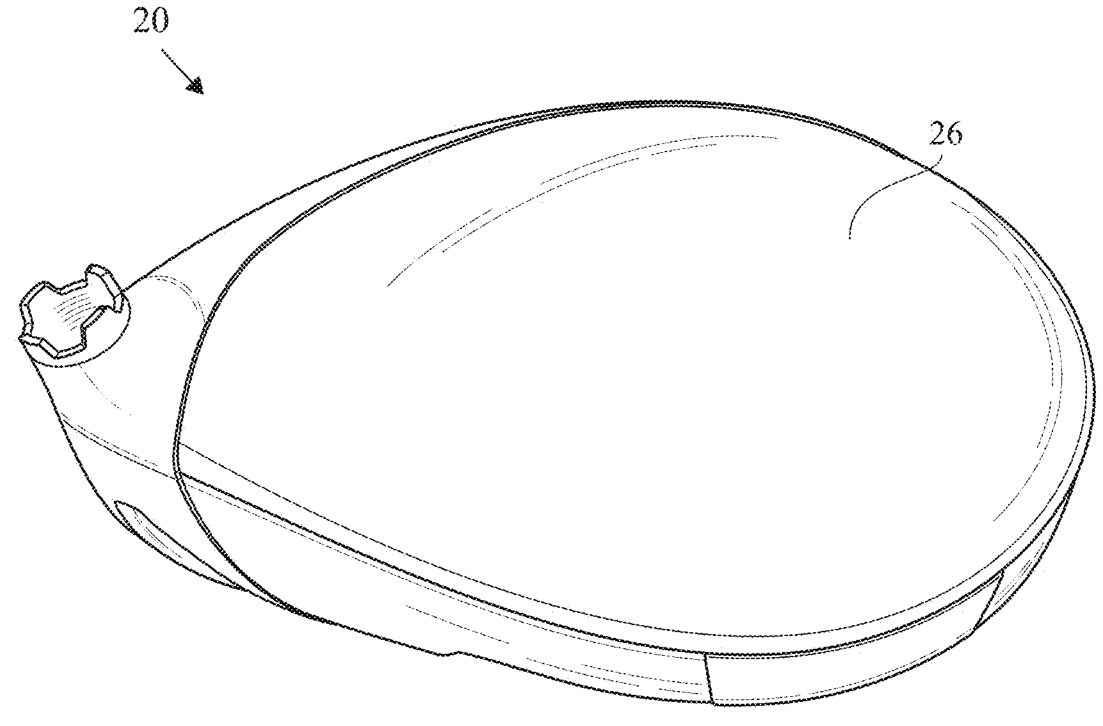
FIG. 12 is a rear perspective view of a golf club head.
Figure 13:
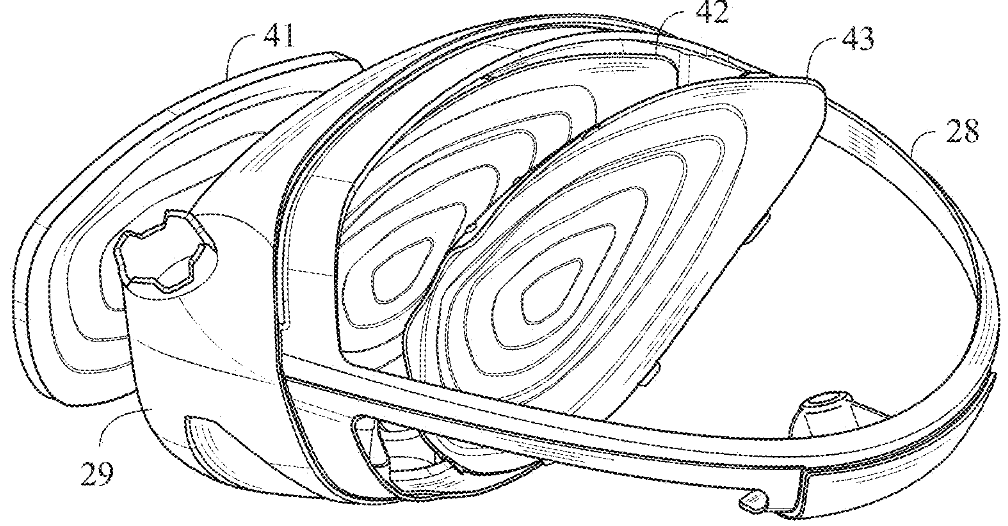
FIG. 13 is an exploded view of components of a golf club head.
Figure 14:
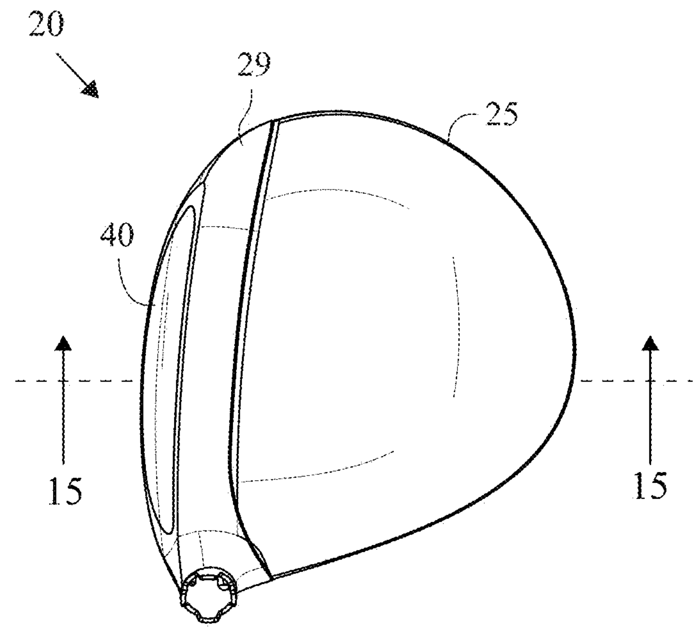
FIG. 14 is a top plan view of a golf club head.
Figure 15:
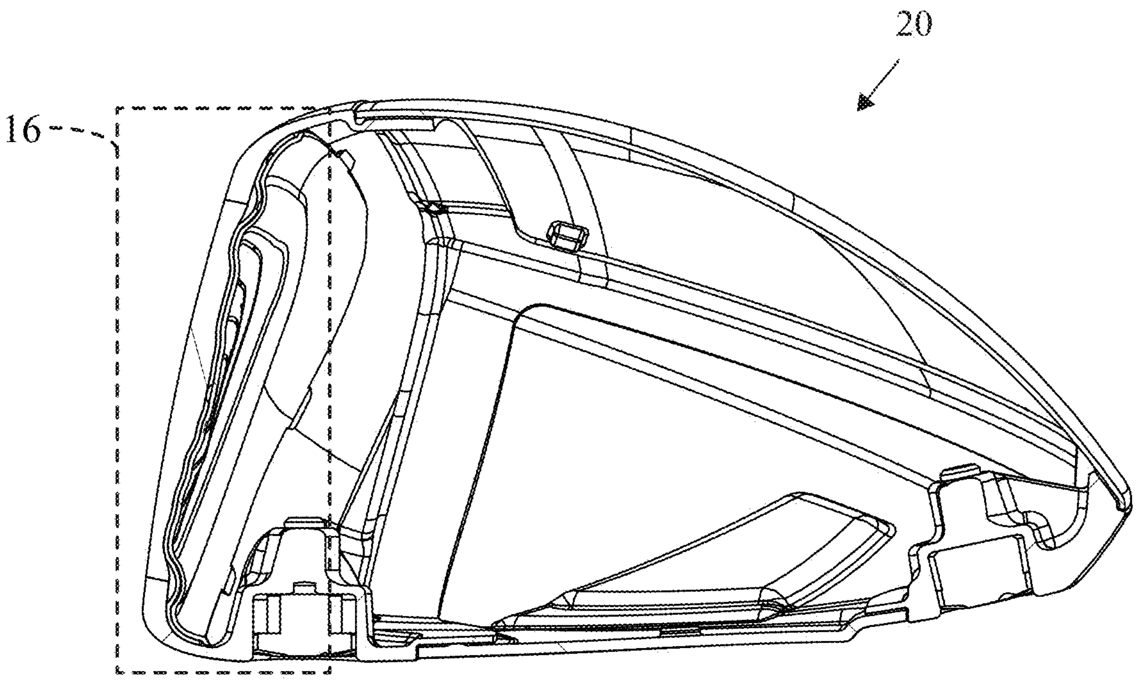
FIG. 15 is a cross-sectional view along line 15-15 of FIG. 14.
Figure 16:
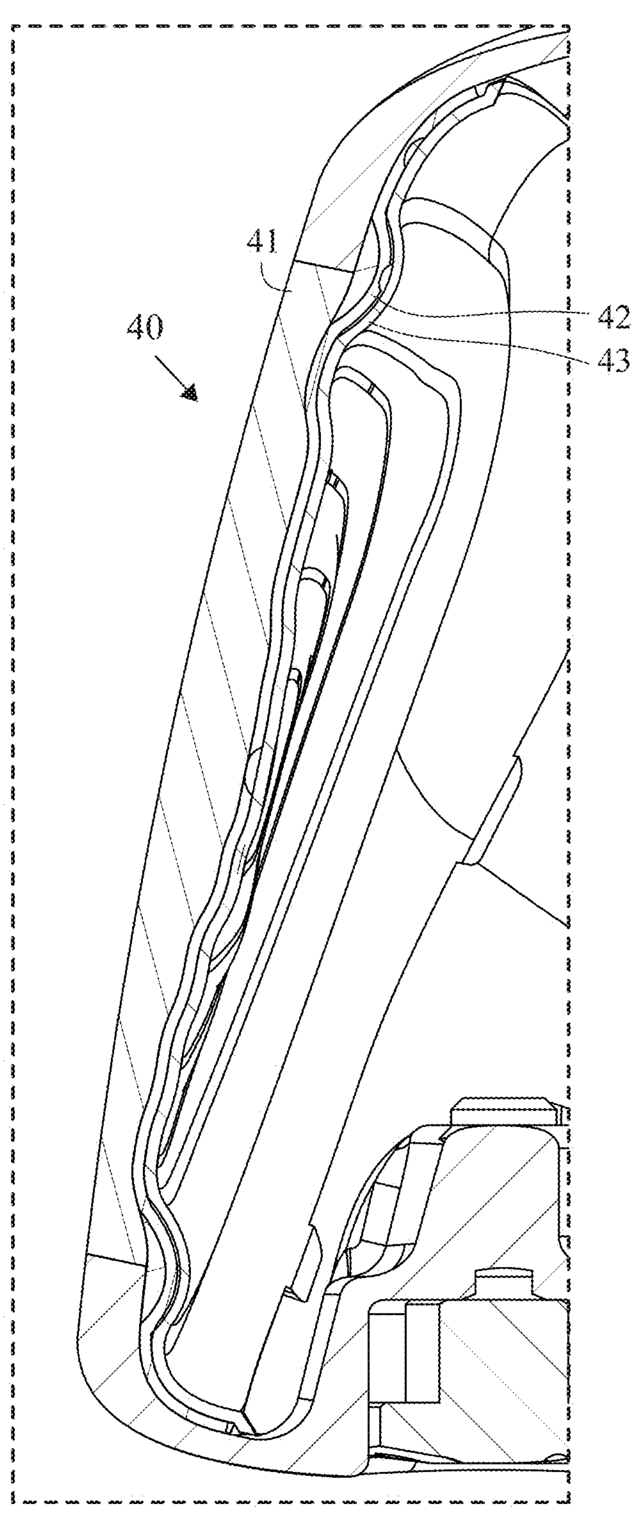
FIG. 16 is an isolated view of the multiple layer face of the golf club head of FIG. 15.

A golf club head 20 with a multiple layer face 40 is shown in the figures. The golf club head 20 has a body 25. The body 25 includes a crown section 26, a sole section 27, a frame 28 and a face cup component 29.

The multiple layer face 40 preferably has three layers: a first layer 41, a second layer 42 and a third layer 43. The second layer 42 is preferably attached to an internal surface 41*a* of the first layer 41. The third layer 43 is preferably attached to an internal surface 42*a* of the second layer 42.

One embodiment is a golf club head 20 comprising a body 25 and a face 40 attached to a face cup section 29 of the body 25. The face 40 comprises a first layer 41, a second layer 42 and a third layer 43. The first layer 41 is composed of a metal material and has a thickness ranging from 0.02 inch to 0.2 inch. The second layer 42 is attached to an internal surface 41*a* of the first layer 41. The second layer 42 is composed of a polyurea material and has a thickness ranging from 0.003 inch to 0.15 inch. The third layer 43 is attached to an internal surface 42*a* of the second layer 42. The third layer 43 is composed of a composite material (preferably carbon pre-preg) and has a thickness ranging from 0.005 inch to 0.15 inch. The face 40 (all three layers) has a total thickness ranging from 0.030 inch to 0.500 inch.

The golf club head 20 preferably has a coefficient of restitution (COR) of at least 0.84. The golf club head 20 preferably has a characteristic time (CT) value of at least 270. The face 40 preferably has a specific modulus of greater than 24E6 m^2 s^-2. The face 40 preferably has a plastic strain capacity of 1-25%.

The first layer 41 is preferably composed of a titanium alloy or an iron alloy material.

In one embodiment, the first layer 41 of the face 40 has a variable face thickness.

The crown section 26 and the sole section 27 of the body 25 are preferably composed of composite materials. The frame 28 and the face cup component 29 are preferably composed of a metal material, most preferably a titanium alloy (preferably cast). Alternatively, the metal material is a stainless steel.

In an alternative embodiment, the golf club head 20 has a multiple layered face 40 attached to a body 25. The face 40 comprises a first layer 41, a second layer 42 and a third layer 43. The first layer 41 is composed of a titanium alloy material and has a thickness ranging from 0.08 inch to 0.15 inch. The second layer 42 is attached to an internal surface 41*a* of the first layer 41. The second layer 42 is composed of a polyurea material and has a thickness ranging from 0.005 inch to 0.02 inch. The third layer 43 is attached to an internal surface 42*a* of the second layer 42. The third layer 43 is composed of a composite material and has a thickness ranging from 0.022 inch to 0.08 inch.

Figure 17:
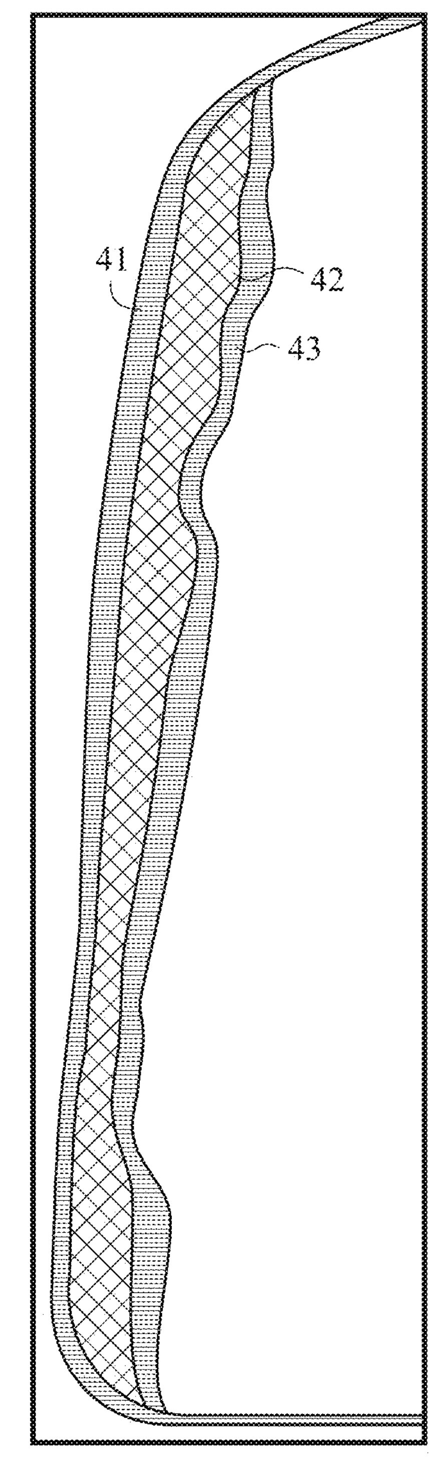
FIG. 17 is a cross-sectional view of a face component.
Figure 18:
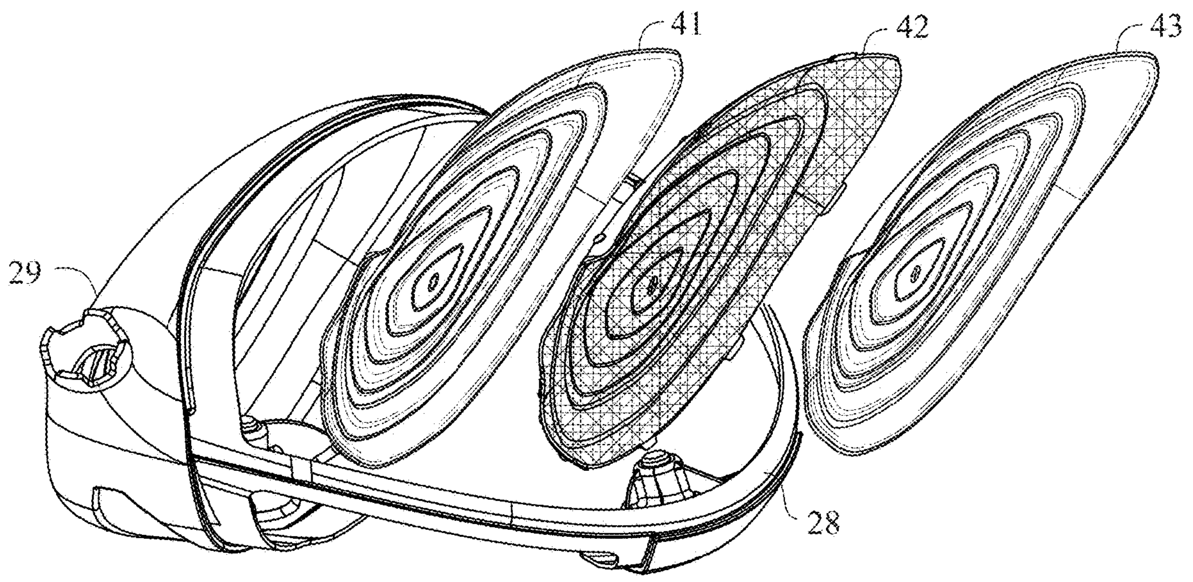
FIG. 18 is an exploded view of components of a golf club head with the face components of FIG. 17.

In yet another alternative embodiment shown in FIGS. 17 and 18, the golf club head 20 has a multiple layered face 40 with a first layer 41 is composed of a titanium alloy material and has a thickness ranging from 0.08 inch to 0.15 inch, a second layer 42 is attached to an internal surface of the first layer 41 and is a lattice structure composed of an additive manufacturing (3D printing) material and has a thickness ranging from 0.08 inch to 0.3 inch. The third layer 43 is attached to an internal surface of the second layer 42. The third layer 43 is composed of a titanium alloy material and has a thickness ranging from 0.08 inch to 0.15 inch.

Figure 19:
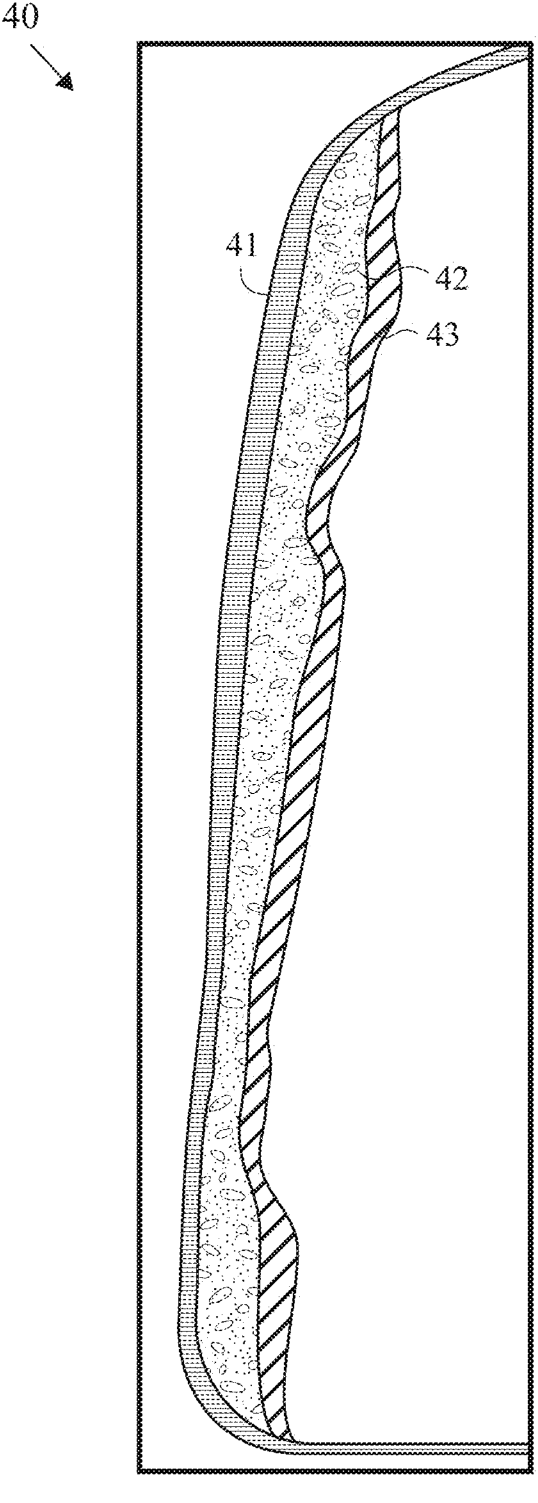
FIG. 19 is a cross-sectional view of a face component.
Figure 20:
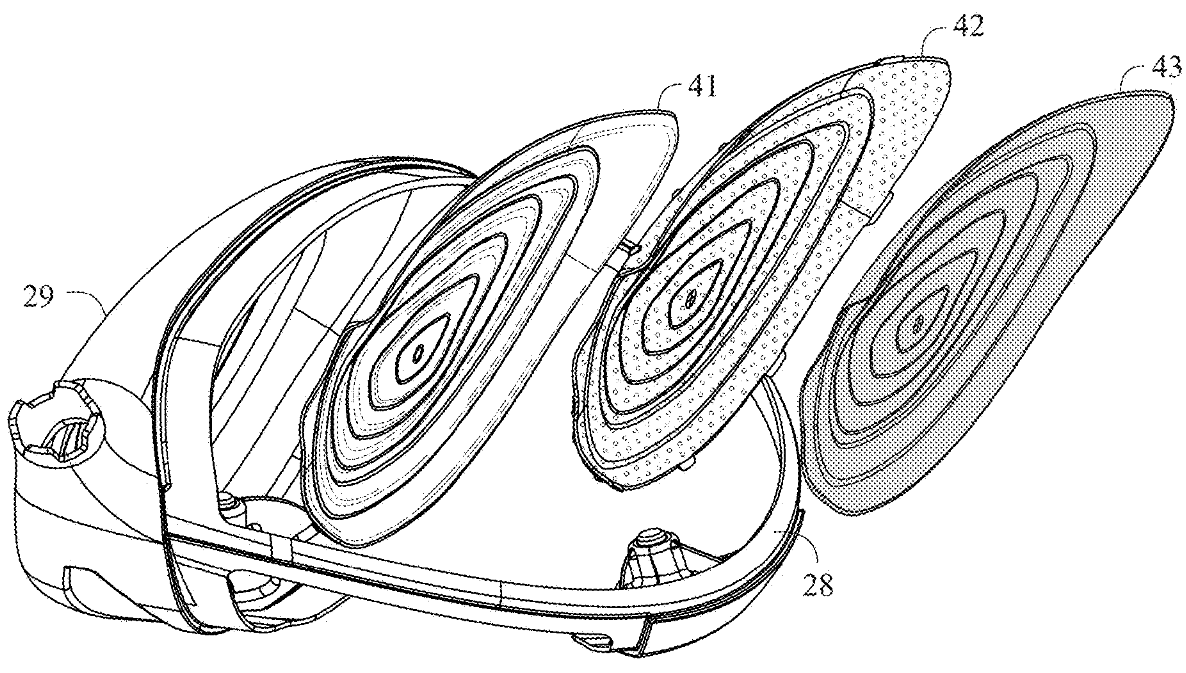
FIG. 20 is an exploded view of components of a golf club head with the face components of FIG. 19.

In yet another embodiment shown in FIGS. 19-20, the golf club head 20 has a multiple layered face 40 in which a first layer 41 is part of the body or face component structure, the second layer 42 is a polymer layer, and the third layer 43 is a composite material.

Figure 21:
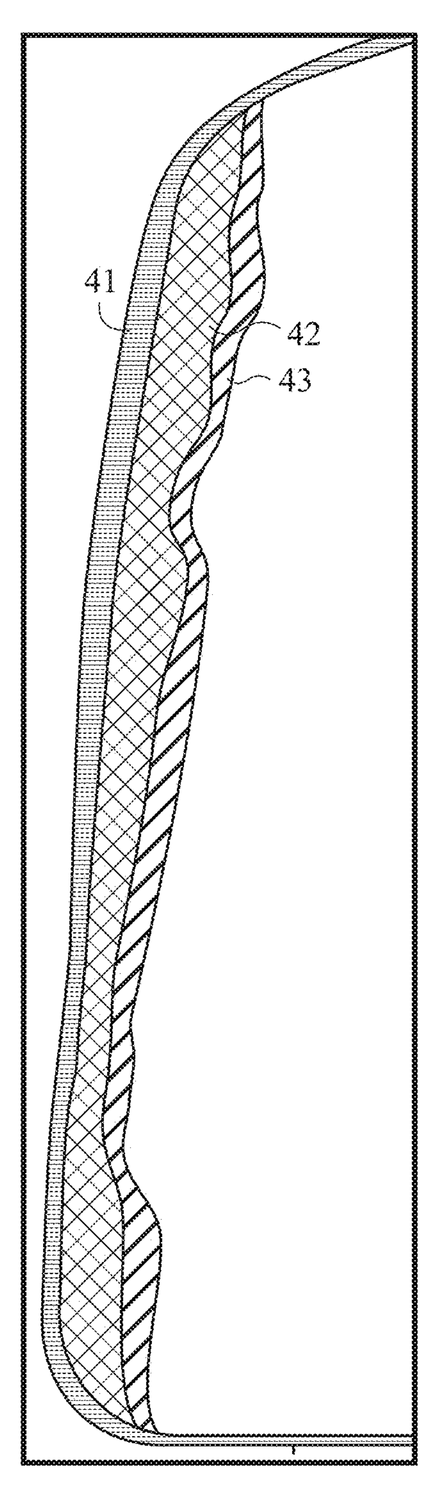
FIG. 21 is a cross-sectional view of a face component.
Figure 22:
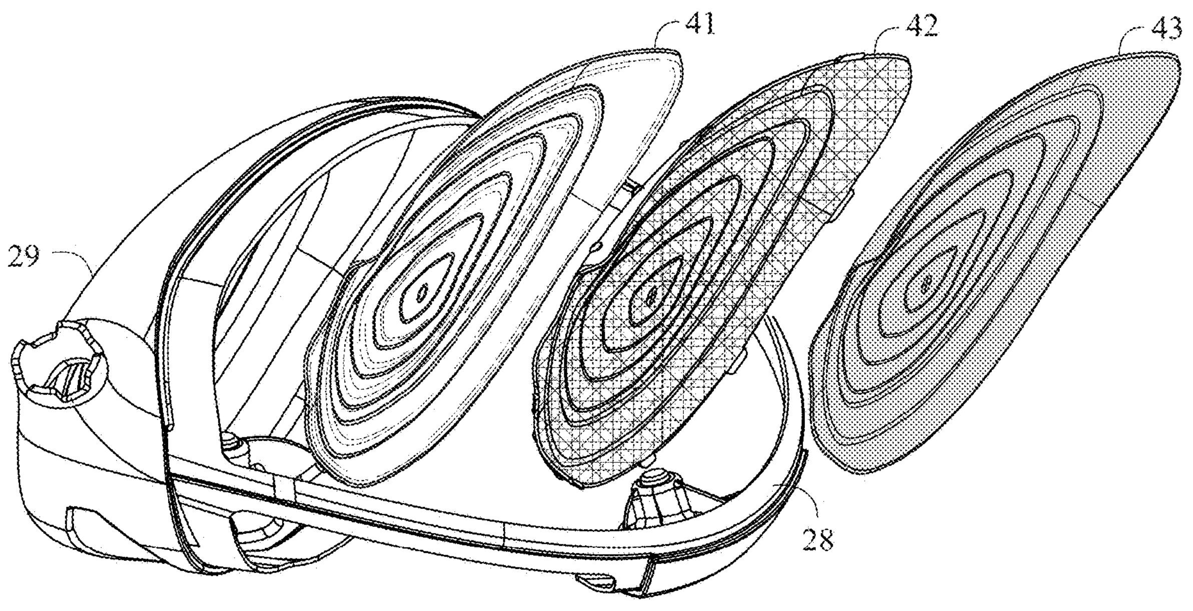
FIG. 22 is an exploded view of components of a golf club head with the face components of FIG. 17.

In yet another embodiment shown in FIGS. 21-22, the golf club head 20 has a multiple layered face 40 with a first layer 41 is composed of a titanium alloy material and has a thickness ranging from 0.08 inch to 0.15 inch, a second layer 42 is attached to an internal surface of the first layer 41 and is a lattice structure composed of an additive manufacturing (3D printing) material and has a thickness ranging from 0.08 inch to 0.3 inch. The third layer 43 is attached to an internal surface of the second layer 42. The third layer 43 is composed of a composite material and has a thickness ranging from 0.022 inch to 0.08 inch.

Using novel combinations in the right sequence allows for an overall material property feature that is not possible with uniform materials used in golf design. Those combinations help to alter the modulus of the combined materials and provide new modulus options to our designers. Testing confirmed the unexpected prediction from the analysis.

A preferred embedment is a titanium frame, which has a plurality of openings. The main openings are for a crown, sole, and face insert. A face insert of a similar material to the titanium frame is welded to the frame. After that process, a layer or polymeric material is applied and press another material made of carbon fiber over the polymeric material. The polymeric material is first in a liquid state during the pressing and goes through a curing process, after which the pressure is released after the polymeric material cures, and the carbon fiber panel is permanently attached via the polymeric material to the back of the face. The polymeric material is not limited to but should cover the inner surface of the striking region and can include a portion of the crown/sole/heel/toe transition surfaces that connect the striking face to the body portions of the golf club.

During testing, a variety of the material dimensions to test their effects on the overall design. For the polymeric material, the thickness was adjusted as a projection normal from the face. Testing the polymeric material in ranges from 0.020 inch to 0.160 inch resulted in a preferred embodiment of around 0.040 inch. The testing revealed an increase in durability of 102% over a non-polymeric coated face. The polymeric material was combined with a panel of carbon composite which resulted in another metric that was improved by 47% over a face without a polymeric coating and a carbon composite panel. Ideally the composite material is made of layers of material that lead to a relatively isotropic stiffness. Other embodiments utilize directional stiffness properties, using a panel of all aligned unidirectional material layers that can be significantly oriented in the vertical direction. Another embodiment utilizes varying degrees of stiffness in horizontal, vertical, and combination vectors to tune the stiffness property of the composite structure.

To finish the design, carbon fiber panels for the crown and sole are bonded to the crown and sole openings to create a closed volume. This creates a traditional golf club head when viewed by a golfer.

TABLE ONE

| Optimization | Option 1 | Option 2 |
|---|---|---|
| Ti-64 Front Layer thickness | 0.096 inch | 0.114 inch |
| Polyurea mid-layer thickness | 0.015 inch | 0.005 inch |
| # of QISO plies in the back layer | 9 | 3 |
| COR Ctr COR | 0.878 | 0.882 |
| CT | 282.166 | 277.603 |

Adhering a polymer coating to the rear side of the striking face improves the durability of the golf club during impact with a golf ball. These improvements may include an increased hits-to-failure ratio and/or reduced deformation in the face. This polymer coating can be specifically used on brittle face materials that would not otherwise be suitable for use in this application due to poor durability. These brittle materials can provide performance benefits for golf clubs if the durability is improved with the addition of a polymer coating on the rear of the striking face.

The polymer coating provides reinforcement for high specific modulus (Young's Modulus per Density, greater than 24E6 m^2 s^-2) materials, which includes specific types of metal, alloy, metal matrix composite, ceramic, etc, with relatively high brittleness due to relatively low plastic strain capacity (1%-25%, in engineering strain), to improve the structural durability under consecutive impact loading cycles. The addition of a polymer coating increases the plastic strain capacity of the material, while maintaining the beneficially high specific modulus of the material.

Polyurea is manufactured by reacting an Oligomeric Diamine with a Diisocyanate. The mechanical properties of the material can be manipulated by altering the ratio of the two components. Specifically, mass ratios ranging from 5-parts Diamine: 1-part Diisocyanate to 1-part Diamine:1-part Diisocyanate are useful for the current application. More specifically, a mass ratio of 4-parts Diamine:1-part Diisocyanate is most effective for the current application.

Preferably, the components used in the polyurea reaction are: Versalink® P-1000 (Oligomeric Diamine, manufactured by Evonik Industries); Isonate™ 143L Modified MDI (Polycarbodiimide-Modified Diphenylmethane Diisocyanate, manufactured by Dow Chemical Company); The preferred mass ratio of the components is 4-parts Versalink® P-1000: 1-part Isonate™ 143L Modified MDI; The components are mechanically mixed together to begin the reaction; Pot life of the mixture is approximately 15 minutes; The mixture will by dry to the touch after roughly 1 hour in ambient conditions; The mixture will reach full cure (full mechanical strength) after 7 days in ambient conditions, or alternatively after 24 hours at 80 deg Celsius.

TABLE TWO

| Layers | Option 1 | Option 2 |
|---|---|---|
| Metal Front Layer thickness | 0.020 to 0.200 inch | 0.025 to 0.150 inch |
| Polyurea mid-layer thickness | 0.003-0.150 inch | 0.005-0.050 inch |
| Composite back layer | 0.005-0.150 inch | 0.010-0.050 inch |
| Structure Total thickness | 0.030-0.500 inch | 0.040-0.250 inch |

Composite Material

Individual layers or plies in the composite laminate may be comprised of a unidirectional (UD) composite layer or a fabric consistent of a bi-axial of tri-axial woven composite. For the purpose of this invention, the fiber reinforcement in the composite material system may include carbon, fiberglass, aramid or any combination of the three.

The number of layers or plies in a stack of a composite laminate of the present invention can vary between 2 and 200 plies. A composite laminate with several layers. Each composite ply may be a composite of either UD, bi-axial or tri-axial woven composite. The fabric area weight (FAW) of each composite ply can range from 20 gsm up to 500 gsm. The fiber reinforcement in the composite material for each ply may include carbon, fiberglass, aramid or any combination of the three. The matrix material that is combined with the fiber bundles of each ply to create the composite material of the present invention can be of a thermosetting (epoxy, polyester, vinyl ester, etc.) or a thermoplastic (nylon, polycarbonate, PPS, PEKK, PEEK, etc.) material. Cross-sections of a UD composite panel and a UD and multi-axial composite laminate, respectively, show different layers.

In some embodiments, the composite may be sheet molding compound (SMC), which may be comprised of chopped fibers. Each chopped fiber has a length less than 0.0625 inch or a length that is no less than 2 inches and no more than 4 inches.

The SMC of the present invention has the following qualities: the fiber reinforcement of the SMC may include carbon, fiberglass, aramid or any combination of the three; the matrix material that is combined with the fiber bundles of each ply to create the composite material of the present invention can be a thermosetting (epoxy, polyester, vinyl ester, etc.) or a thermoplastic (nylon, polycarbonate, PPS, PEKK, PEEK, etc.) material; and the thickness of the SMC may vary between 0.015 inch to 0.250 inch.

In some of the embodiments disclosed herein, a face component is preferably cast from molten metal in a method such as the well-known lost-wax casting method. The metal for casting is preferably titanium or a titanium alloy such as 6-4 titanium alloy, alpha-beta titanium alloy or beta titanium alloy for forging, and 6-4 titanium for casting. Alternatively, the face component is composed of 17-4 steel alloy. Additional methods for manufacturing the face component include forming the body from a flat sheet of metal, super-plastic forming the face component from a flat sheet of metal, machining the face component from a solid block of metal, electrochemical milling the face component from a forged pre-form, casting the body using centrifugal casting, casting the face component using levitation casting, and like manufacturing methods.

The face component preferably has a return portion that extends laterally rearward from the perimeter of the front wall. The return portion of the face component preferably includes an upper lateral section, a lower lateral section, a heel lateral section and a toe lateral section. Thus, the return portion preferably encircles the striking plate insert a full 360 degrees. However, those skilled in the pertinent art will recognize that the return portion may only encompass a partial section of the striking plate insert, such as 270 degrees or 180 degrees, and may also be discontinuous.

The upper lateral section extends rearward, towards the central body component, a predetermined distance, d, to engage the crown. In a preferred embodiment, the predetermined distance ranges from 0.2 inch to 1.0 inch, more preferably 0.40 inch to 0.75 inch, and most preferably 0.68 inch, as measured from the perimeter of the striking plate insert to the rearward edge of the upper lateral section. In a preferred embodiment, the upper lateral section has a general curvature from the heel end to the toe end. The upper lateral section has a length from the perimeter of the striking plate insert that is preferably a minimal length near the center of the striking plate insert, and increases toward the toe end and the heel end. However, those skilled in the relevant art will recognize that the minimal length may be at the heel end or the toe end.

The face component engages the crown portion of the central body component along a substantially horizontal plane with some curvature. The return portion has an undercut portion, and a front end of the crown portion is placed over the undercut portion.

The heel lateral section is substantially perpendicular to the striking plate insert, and the heel lateral section covers the hosel before engaging an optional ribbon section and a bottom section of the sole portion of the central body component. The heel lateral section is attached to the sole portion. The heel lateral section preferably extends inward a distance, d''', from the perimeter a distance of 0.250 inch to 1.50 inches, more preferably 0.50 inch to 1.0 inch, and most preferably 0.950 inch. The heel lateral section preferably has a general curvature at its edge.

At the other end of the face component is the toe lateral section. The toe lateral section is attached to the sole portion. The toe lateral section extends inward a distance, d'', from the perimeter a distance of 0.250 inch to 1.50 inches, more preferably 0.75 inch to 1.30 inch, and most preferably 1.20 inch. The toe lateral section preferably has a general curvature at its edge.

The lower lateral section of the face component extends inward, toward the central body component, a predetermined distance to engage the sole portion. In a preferred embodiment, the predetermined distance ranges from 0.2 inch to 1.25 inches, more preferably 0.50 inch to 1.10 inch, and most preferably 0.9 inch, as measured from the perimeter of the striking plate insert to the edge of the lower lateral section. In a preferred embodiment, the lower lateral section has a general curvature from the heel end to the toe end. The lower lateral section has a length from the perimeter of the striking plate section that is preferably a minimal length near the center of the striking plate section, and increases toward the toe end 38 and the heel end.

In some embodiments, a first layer of the face is composed of a metal material such as titanium alloy or steel. The first layer of the face is preferably composed of a metal that is different from the metal of the body 20, such as SP700 titanium alloy, carpenter steel, or the like. The body is preferably a cast from a metal material and the face is preferably forged or formed from a metal material, such as titanium alloy or stainless steel.

Lattice Structure

Additive manufacturing techniques, also known as 3D printing, can be used to create the lattice structures for the face component. For example, direct metal laser sintering (DMLS), direct metal laser melting (DMLM), and electron beam additive manufacturing (EBAM) use controlled energy sources, including lasers and electron beams in which intense, extremely localized heat is applied to metal powder to melt and/or sinter adjacent particles together. A binder jet process may also be used such as disclosed in U.S. Pat. No. 11,484,757, which is hereby incorporated by reference in its entirety. The binder jet process also allows for printing with different powdered materials, including metals and non-metals like plastic. It works with standard metal powders common in the metal injection molding (MIM) industry. The materials for binder jet printing also include plastic, nylon, polycarbonate, polyetherimide, polyetheretherketone, and polyetherketoneketone. These materials can be reinforced with fibers such as carbon, fiberglass, Kevlar®, boron, and/or ultra-high-molecular-weight polyethylene.

In any of the embodiments disclosed herein, when the golf club head 10 is designed as a driver, it preferably has a volume from 200 cubic centimeters to 600 cubic centimeters, more preferably from 300 cubic centimeters to 500 cubic centimeters, and most preferably from 420 cubic centimeters to 470 cubic centimeters, with a most preferred volume of 460 cubic centimeters. In fact, in the preferred embodiment, the golf club head 10 has a volume of approximately 450 cc to 460 cc. The volume of the golf club head 10 will also vary between fairway woods (preferably ranging from 3-woods to eleven woods) with smaller volumes than drivers. When designed as a driver, the golf club head 10 preferably has a mass of no more than 215 grams, and most preferably a mass of 180 to 215 grams; when designed as a fairway wood, the golf club head 10 preferably has a mass of 135 grams to 200 grams, and preferably from 140 grams to 165 grams. The mass of the body 20, and thus the overall discretionary mass of the golf club head 10, can be adjusted by creating a cutout 21 in the sole section 22 and filling it with an insert 90 composed of a lightweight material such as carbon composite, plastic, or a low density metal alloy. Similarly, the crown insert 42 can be formed of a carbon composite material to free up additional discretionary mass.

Demille et al., U.S. Pat. No. 9,283,447 for a Golf Club Head With A Composite Face is hereby incorporated by reference in its entirety.

Demille et al., U.S. Pat. No. 9,283,449 for a Golf Club Head With A Composite Face is hereby incorporated by reference in its entirety.

The golf club parts, and particularly the faces, disclosed herein preferably have a variable thickness pattern, which may be any of the patterns disclosed in U.S. Pat. Nos. 5,163,682, 5,318,300, 5,474,296, 5,830,084, 5,971,868, 6,007,432, 6,338,683, 6,354,962, 6,368,234, 6,398,666, 6,413,169, 6,428,426, 6,435,977, 6,623,377, 6,997,821, 7,014,570, 7,101,289, 7,137,907, 7,144,334, 7,258,626, 7,422,528, 7,448,960, 7,713,140, 8,012,041, and 8,376,876, the disclosure of each of which is incorporated in its entirety herein. The golf club parts disclosed herein may also have the variable face thickness patterns disclosed in U.S. Patent Application Publication No. 20120021849, the disclosure of which is incorporated in its entirety herein.

In other embodiments, the golf club head 10 may have a multi-material composition such as any of those disclosed in U.S. Pat. Nos. 6,244,976, 6,332,847, 6,386,990, 6,406,378, 6,440,008, 6,471,604, 6,491,592, 6,527,650, 6,565,452, 6,575,845, 6,478,692, 6,582,323, 6,508,978, 6,592,466, 6,602,149, 6,607,452, 6,612,398, 6,663,504, 6,669,578, 6,739,982, 6,758,763, 6,860,824, 6,994,637, 7,025,692, 7,070,517, 7,112,148, 7,118,493, 7,121,957, 7,125,344, 7,128,661, 7,163,470, 7,226,366, 7,252,600, 7,258,631, 7,314,418, 7,320,646, 7,387,577, 7,396,296, 7,402,112, 7,407,448, 7,413,520, 7,431,667, 7,438,647, 7,455,598, 7,476,161, 7,491,134, 7,497,787, 7,549,935, 7,578,751, 7,717,807, 7,749,096, and 7,749,097, the disclosure of each of which is hereby incorporated in its entirety herein.

Seluga et al., U.S. Pat. No. 9,757,629 for a Golf Club Head Having Stress Reducing Features is hereby incorporated by reference in its entirety.

Seluga et al., U.S. Pat. No. 9,776,058 for a Golf Club Head Having Optimized Ball Speed To CT Relationship is hereby incorporated by reference in its entirety.

Seluga et al., U.S. Pat. No. 11,433,281 for a Method For Manufacturing Golf Club Head Having Stress Reducing Features is hereby incorporated by reference in its entirety.

Gibbs et al., U.S. Pat. No. 11,433,282 for a Method For Manufacturing Golf Club Head Having Stress Reducing Features is hereby incorporated by reference in its entirety.

Davis et al., U.S. Pat. No. 11,400,349 for Golf Club Head With Heel And Toe Stiffeners is hereby incorporated by reference in its entirety.

Nunez et al., U.S. Pat. No. 11,364,423 for a Golf Club Head Having Stress Reducing Features is hereby incorporated by reference in its entirety.

DeMille et al., U.S. Pat. No. 11,331,544 for Binder Jet Printed Golf Club Components With Lattice Structures is hereby incorporated by reference in its entirety.

Westrum et al., U.S. Pat. No. 11,090,534 for a Golf Club Head Comprising Microscopic Bubble Material is hereby incorporated by reference in its entirety.

Frederickson, U.S. Pat. No. 11,083,939 for a Golf Club Head With Adjustable Sole Weight is hereby incorporated by reference in its entirety.

Del Rosario et al., U.S. Pat. No. 11,027,176 for a Golf Club Head With Hosel Support Structurel is hereby incorporated by reference in its entirety.

Hanhart et al., U.S. Pat. No. 10,912,970 for a Golf Club Head Having Adjustable Stress Reducing Features is hereby incorporated by reference in its entirety.

Frederickson, U.S. Pat. No. 10,716,984 for a Golf Club Head With Adjustable Center Of Gravity is hereby incorporated by reference in its entirety.

DeMille et al., U.S. Pat. No. 10,105,579 for a Golf Club Head With A Compression-Molded, Thin-Walled Aft-Body is hereby incorporated by reference in its entirety.

Seluga, U.S. Pat. No. 10,099,096 for a Golf Club Head With Center Of Gravity Adjustability That Optimizes Products Of Inertia is hereby incorporated by reference in its entirety.

Seluga, U.S. Pat. No. 9,968,834 for a Golf Club Head With Adjustable Center Of Gravity is hereby incorporated by reference in its entirety.

DeMille et al., U.S. Pat. No. 9,283,447 for a Golf Club Head With Composite Face is hereby incorporated by reference in its entirety.

Griffin et al., U.S. Pat. No. 9,381,409 for a Multiple Material Iron is hereby incorporated by reference in its entirety.

DeMille et al., U.S. Pat. No. 9,387,373 for a Golf Club Head With Composite Weight Port is hereby incorporated by reference in its entirety.

Rice et al., U.S. Pat. No. 9,468,819 for a Golf Club Head is hereby incorporated by reference in its entirety.

DeMille et al, U.S. Pat. No. 11,786,784 for a Golf Club Head is hereby incorporated by reference in its entirety.

U.S. Pat. No. 10,238,933 is hereby incorporated by reference in its entirety.

U.S. Pat. No. 9,259,627 is hereby incorporated by reference in its entirety.

U.S. Pat. No. 9,180,349 is hereby incorporated by reference in its entirety.

U.S. Pat. No. 8,834,294 is hereby incorporated by reference in its entirety.

U.S. Pat. No. 9,352,199 is hereby incorporated by reference in its entirety.

U.S. Pat. No. 9,067,110 is hereby incorporated by reference in its entirety.

U.S. Pat. No. 9,345,936 is hereby incorporated by reference in its entirety.

U.S. Pat. No. 8,956,244 is hereby incorporated by reference in its entirety.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention the following:

1. A golf club head comprising:

a body comprising a crown section, a sole section and a face section having a front opening and having an attached frame, wherein the body defines a hollow interior, wherein the face section is composed of a metal material, wherein the crown section and the sole section are each composed of a composite material;

a face attached to the body, the face comprising a first layer composed of a metal material, the first layer having a thickness ranging from 0.020 inch to 0.200 inch, a second layer attached to an internal surface of the first layer, the second layer composed of 3D printed lattice structure, the second layer having a thickness ranging from 0.003 inch to 0.150 inch, a third layer attached to an internal surface of the second layer, the third layer composed of a composite material, the third layer having a thickness ranging from 0.005 inch to 0.150 inch, wherein a rear surface of the third layer further defines the hollow interior of the body;

wherein the face has a total thickness ranging from 0.030 inch to 0.500 inch;

wherein the face has a specific modulus of greater than 24E6 m^2 s^-2.

2. The golf club head according to claim 1 wherein the golf club head has a COR of at least 0.84.

3. The golf club head according to claim 1 wherein the golf club head has a characteristic time value of at least 270.

4. The golf club head according to claim 1 wherein the face has a plastic strain capacity of 1-25%.

5. The golf club head according to claim 1 wherein the first layer a variable face thickness.

6. The golf club head according to claim 1 wherein the body is composed of metal and composite.

7. The golf club head according to claim 1 wherein the body comprises a sole portion, a crown portion and a front wall with a hole for placement of the face therein.

* * * * *